H. SLOAN.
Grain Drill.
No. 25,447. Patented Sept. 13, 1859.
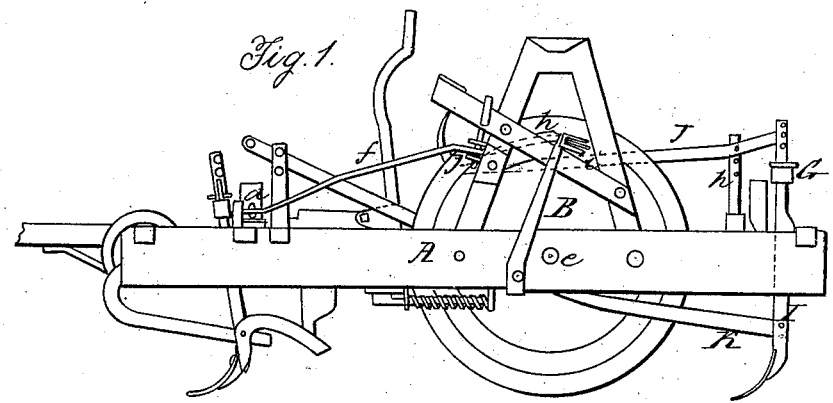
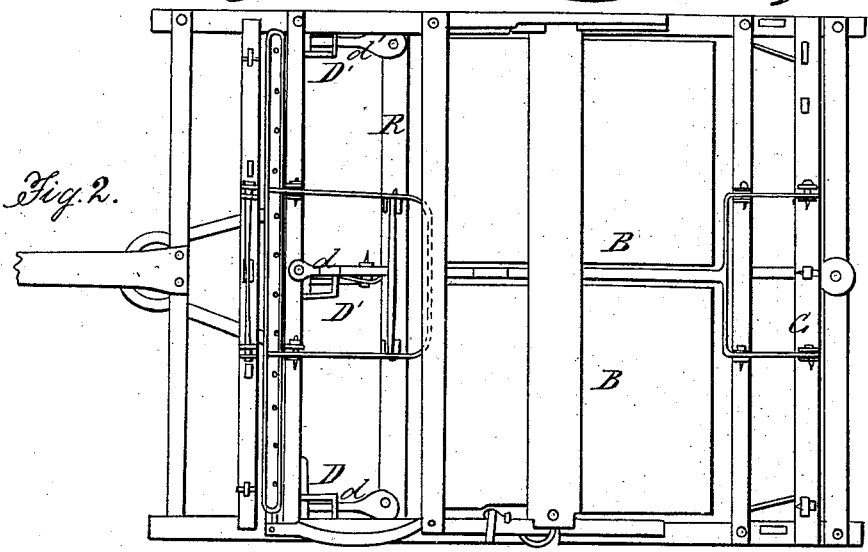
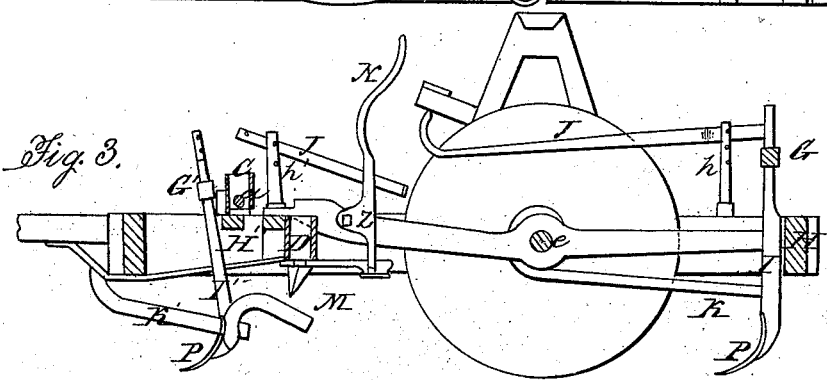

UNITED STATES PATENT OFFICE.

HERVEY SLOAN, OF FRANKLIN, INDIANA.

IMPROVEMENT IN SEEDING-MACHINES.

Specification forming part of Letters Patent No. 25,447, dated September 13, 1859.

*To all whom it may concern:*

Be it known that I, HERVEY SLOAN, of Franklin, in the county of Johnson and State of Indiana, have invented certain new and useful Improvements in Seed-Planting Cultivators; and I do hereby declare that the following is a full, clear, and exact description of the same, reference being had to the accompanying drawings, and to the letters of reference marked thereon.

The nature of my invention consists in constructing and arranging the several parts of the machine substantially as hereinafter described.

In the annexed drawings, Figure 1 represents a side elevation of the machine. Fig. 2 represents a plan view. Fig. 3 is a vertical longitudinal section.

In the figures, A represents the frame of the machine, which is made a convenient size and in a strong durable manner.

B B represent two rollers, which are secured in the frame A by means of a shaft, $e$, which passes through from end to end of said rollers, and has its bearings in the frame. These rollers are made large and heavy enough to crush the clods of earth and smooth the small inequalities of ground as it passes along in its course. Secured in this frame A are three seed-boxes, D D' D'', which are for the purpose of planting corn in check-rows or drilling the same. There is also another seed-box in the frame, (marked C,) which is for the purpose of seeding small grain. The box C is provided with a slide, $a$, by means of which the seed is worked out of the box, said slide $a$ being operated by means of a box, $f$, which connects at one end to said slide, has its fulcrum at $j$, and is provided at its other end with a friction-roller, $i$, which works against the end of one of the rollers in a cam-groove in it.

$d\ d\ d$ are seed-slides in the boxes D D' D'', said slides being pivoted at their rear ends to cross-bar R, said bar R being operated by means of a hand-lever, N, which has its fulcrum at $z$, one end being secured to bar R, while the other end projects above the frame.

I I' represent shanks which stand in a vercical position, as seen. The upper ends of these thanks pass through bars G G', and are sesured in any suitable manner in them. To the lower ends of these shanks are attached cultivator-teeth P P.

H H represent cross-bars, against which the backs of the shanks rest.

K K' are drag-bars which hold the shanks and which drag them. These drag-bars are secured to the shanks near their lower ends, and reach forward, one of them being attached at its front end to the axle $e$, while the other is attached to the front of the frame A.

J J' represent levers which have their fulcrums on standards $h\ h'$. Said levers are secured at one end to the shanks, and are for the purpose of elevating or depressing said shanks.

The rollers B B in this machine may be used when necessary, and when required they may be removed, and wheels may be secured on the axle, thus making the machine lighter and better adapted for certain purposes.

In using this machine it will be seen that the seed-slide which distributes small grain is operated by the rollers or wheels when the machine, while the slides for seeding corn are operated by hand-power. The operator stands upon the machine and operates the corn-slides and the cultivator-teeth.

M M represent peculiar-shaped bars which are attached to the shanks, which work behind the teeth and act as coverers for the corn.

This machine is very convenient and useful, as it will prepare, lay off, and roll the ground, while it will seed and cover the grain all at the same operation.

Having thus fully described my invention, what I claim as new, and desire to secure by Letters Patent, is—

1. The arrangement of shanks I I', drag-bars K K', levers J J', bar G, rest H, and support $h$, the same being combined and operating substantially as and for the purpose herein specified.

2. In connection with the subject of the first claim, the arrangement of rollers B B, seed-boxes C and D, slides $a$ and $d\ d\ d$, when the same are constructed substantially as and for the purpose specified.

HERVEY SLOAN.

Witnesses:
L. P. RITCHEY,
R. A. ALEXANDER.